United States Patent
Kelch

(10) Patent No.: US 9,417,461 B2
(45) Date of Patent: Aug. 16, 2016

(54) OPTICAL LENS, IN PARTICULAR FOR USE AS A SPECTACLE LENS

(75) Inventor: Gerhard Kelch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 181 days.

(21) Appl. No.: 13/877,161

(22) PCT Filed: Sep. 30, 2011

(86) PCT No.: PCT/EP2011/067141
§ 371 (c)(1),
(2), (4) Date: Jun. 28, 2013

(87) PCT Pub. No.: WO2012/042030
PCT Pub. Date: Apr. 5, 2012

(65) Prior Publication Data
US 2013/0271724 A1    Oct. 17, 2013

Related U.S. Application Data

(60) Provisional application No. 61/388,249, filed on Sep. 30, 2010.

(30) Foreign Application Priority Data

Sep. 30, 2010  (DE) .......................... 10 2010 047 846

(51) Int. Cl.
*G02C 7/02* (2006.01)
*B24B 9/14* (2006.01)
(Continued)

(52) U.S. Cl.
CPC . *G02C 7/022* (2013.01); *B24B 9/14* (2013.01); *B29D 11/00403* (2013.01); *G02B 3/10* (2013.01); *G02C 7/02* (2013.01); *G02C 2202/22* (2013.01)

(58) Field of Classification Search
CPC ........ G02C 7/022; G02C 7/024; G02C 7/027; G02C 2202/22
USPC .............. 351/41–158, 159.7, 159.48, 159.75, 351/178
See application file for complete search history.

(56) References Cited

U.S. PATENT DOCUMENTS 1,273,573 A * 7/1918 Brilhart .................... 351/159.67
1,554,933 A * 9/1925 Wells ....................... 351/159.48
(Continued)

FOREIGN PATENT DOCUMENTS

| CN | 1274860 A | 11/2000 |
|---|---|---|
| CN | 101646968 A | 2/2010 |

(Continued)

OTHER PUBLICATIONS

Charman, W.N., "Hybrid diffractive-refractive achromatic spectacle lenses", Ophthal. Physiol. Opt., 1994, vol. 14, pp. 389 to 392, October, Butterworth-Heinemann for British College of Optometrists.
(Continued)

*Primary Examiner* — Ricky Mack
*Assistant Examiner* — Gary O'Neill
(74) *Attorney, Agent, or Firm* — Walter Ottesen, P.A.

(57) ABSTRACT

An optical lens (10), in particular for use as a spectacle lens, comprises a first lens element (18) and at least one second lens element (20), wherein the first lens element (18) and the second lens element (20) at least partly act together in an achromatic fashion. The second lens element (20) is configured as at least one lens segment (26) that is only arranged in a margin region (28) of the first lens element (18). Furthermore, a method for producing the optical lens (10) is described.

4 Claims, 2 Drawing Sheets

(51) Int. Cl.
  *G02B 3/10* (2006.01)
  *B29D 11/00* (2006.01)

(56) References Cited

U.S. PATENT DOCUMENTS

| | | | |
|---|---|---|---|
| 1,729,066 A | 9/1929 | Courmettes | |
| 1,925,575 A | 9/1933 | Styll | |
| 3,771,858 A | 11/1973 | Bivens | |
| 3,973,838 A * | 8/1976 | Page | G02C 7/04 351/159.7 |
| 5,895,422 A * | 4/1999 | Hauber | A61F 2/1613 351/159.11 |
| 8,777,409 B2 | 7/2014 | Keane et al. | |
| 2008/0088793 A1* | 4/2008 | Sverdrup et al. | 351/159 |
| 2008/0304010 A1* | 12/2008 | Keane et al. | 351/177 |
| 2010/0149485 A1 | 6/2010 | Torrey | |

FOREIGN PATENT DOCUMENTS

| | | |
|---|---|---|
| GB | 219292 A | 1/1925 |
| GB | 487546 A | 6/1938 |
| WO | WO 2008/039802 A2 | 4/2008 |

OTHER PUBLICATIONS

International Search Report dated Dec. 2, 2011 of international application PCT/EP2011/067141 on which this application is based.
English translation of the Office action of the German Patent Office dated Jan. 11, 2013 in German patent application 10 2012 102 743.9.
Diepes, H. et al, "Optics and Technology of Spectacles", 2nd Edition, Optische Fachveroeffentlichung GmbH, Heidelberg, Germany, 2005, Chapter 5.3, 3 pages (English translation).
Shannon, R., "The Art and Science of Optical Design", Cambridge University Press, 1997, pp. 58 to 77.
English translation and Office action of the German Patent Office dated May 9, 2012 in German patent application 10 2012 102 743.9.
English translation and Office action of the German Patent Office dated Jul. 20, 2012 in German patent application 10 2012 102 743.9.
English translation and search report of the European Patent Office dated Jul. 17, 2013 in European patent application 13160400.1-1562.
English translation of the Office action of the German Patent Office dated Apr. 2, 2014 in German patent application 10 2012 102 743.9.
English translation and Office action of the Chinese Patent Office dated Jul. 1, 2014 in Chinese patent application 201310192256.2.
English translation and Office action of the German Patent Office dated Apr. 11, 2011 in German patent application 10 2010 047 846.6 on which the claim of priority is based.

* cited by examiner

OPTICAL LENS, IN PARTICULAR FOR USE AS A SPECTACLE LENS

CROSS REFERENCE TO RELATED APPLICATIONS

This application is the national stage application of international patent application PCT/EP2011/067141, filed Sep. 30, 2011, designating the United States and claiming priority from U.S. provisional application Ser. No. 61/388,249, filed Sep. 30, 2010, and German application 10 2010 047 846.6, filed Sep. 30, 2010, and the entire content of the above applications is incorporated herein by reference.

BACKGROUND OF THE INVENTION

The invention relates to an optical lens, in particular for use as a spectacle lens, comprising a first lens element and at least one second lens element, wherein the first lens element and the second lens element at least partly act together in an achromatic fashion.

The invention furthermore relates to method for producing an optical lens, in particular for use as a spectacle lens.

Such an optical lens is known from the document GB 487 546 A. The optical lens described therein is used as a cataract lens. However, in principle, this lens can also be used as a spectacle lens.

It is generally known that if the spectacle lens is manufactured from only one lens element, spectacle lenses cause chromatic aberration as a result of the wavelength dependence of the refractive indices of the optical materials from which they are manufactured. The chromatic aberrations include the longitudinal colour aberration (also referred to as axial chromatic aberration or longitudinal chromatic aberration), which generates different foci for different wavelengths of the light. In addition to longitudinal colour aberration, there is also, as a further chromatic aberration, the transverse colour aberration (also referred to as colour magnification error or transverse chromatic aberration), which is expressed by coloured fringes or coloured edges in the image plane, which is the retina of the eye in the case of a spectacle lens; this is perceived by the spectacles wearer and considered an annoyance above a certain intensity.

In the case of spectacle lenses, chromatic aberrations, in particular the transverse chromatic aberration, will not be noticeable in an annoying fashion to the spectacles wearer in the case of spectacle lenses with a low power; however, the chromatic aberrations, particularly the transverse chromatic aberrations, increase in spectacle lenses with increasing optical power, independently of whether the defective eyesight to be corrected is based on myopia or hyperopia.

These days, highly-refractive materials, in particular plastics or highly-refractive types of glass, are often used to keep the spectacle-lens thickness as thin as possible for cosmetic reasons. However, precisely materials with a high refractive index have a significantly stronger transverse chromatic aberration because, in general, an increasing refractive index goes hand-in-hand with a lower Abbe number.

Thus, it is desirable at least to reduce such chromatic aberrations, in particular the transverse chromatic aberration, produced by a spectacle lens.

The field of objectives, e.g. for cameras, has disclosed the practice of correcting chromatic aberrations by so-called achromats. In optics, an achromat is understood to mean a system consisting of at least two lenses that consist of materials with different Abbe numbers and/or different refractive indices and hence differ in the dispersion behaviour. Of the two lenses, one is a positive lens, usually manufactured from a material with a higher Abbe number (e.g. crown glass), and the other lens is a negative lens made of a material with a lower Abbe number and hence greater dispersion than the positive lens, with this second lens for example being manufactured from flint glass.

The two lenses are shaped and interconnected on mutually complementary surfaces such that the chromatic aberration is compensated to the best possible extent for two wavelengths. The two lenses then act together achromatically.

Within the meaning of the present invention "at least partly" acting together "in an achromatic fashion" is understood to mean that the achromatic aberration or aberrations need not necessarily be eliminated completely, but is/are at least reduced.

The above-described conventional achromats are not suitable for use as spectacle lenses. Namely, since these achromats are assembled from two complete lenses, they also have a corresponding thickness and, going hand-in-hand with this, an excessive weight.

The lens disclosed in the document GB 487 546A mentioned at the outset consists of two lens elements that substantially have the same refractive index, of which the one lens element is manufactured from flint glass with a refractive index of approximately 1.61 and a reciprocal relative dispersion of approximately 36. The other lens element is manufactured from barium crown glass with a refractive index of approximately 1.61 and a reciprocal relative dispersion of approximately 50. The first-mentioned lens element is a negative lens element, and the lens element mentioned second is a positive lens element. The two lens elements are interconnected on mutually complementary surfaces.

The lens produced thus has a rear side, i.e. a side facing the eye of the wearer, that is entirely formed by the negative lens element, while the front side of the lens, i.e. the side facing away from the eye of the wearer, is partly formed by the surface of the positive lens and, in the margin region thereof, by the surface of the negative lens.

The lens is furthermore afflicted by the disadvantage that it consists of two complete lens elements and hence it is relatively thick and quite heavy.

The professional article "Hybrid diffractive-refractive achromatic spectacle lenses", W. N. Charman, Opthal. Physiol. Opt. 1994, volume 14, pages 389 to 392 also considers the reduction of chromatic aberrations in spectacle lenses. It emphasizes that achromats that have a lens with a low refractive index and a high Abbe number and a lens with a high refractive index and a low Abbe number, of which the one lens is negative and the other is positive, are not practical as spectacle lenses because they are contrary to the desire of having spectacle lenses with a low thickness and a low weight. In order to resolve the disadvantages of achromats, it proposes to combine a refractive lens with a diffractive element, wherein the combination of the refractive lens and the diffractive element can substantially have the same thickness and the same weight as the refractive lens on its own.

However, a spectacle lens composed of a refractive lens and a diffractive element is very complex in terms of the production thereof since the diffractive element has to be produced with great precision in order to avoid that the diffractive element induces other aberrations.

BRIEF SUMMARY OF THE INVENTION

The invention is therefore based on the object of developing an optical lens of the type mentioned at the outset to the effect that the lens has the smallest possible thickness and the lowest possible weight despite having an at least partial achromatic effect.

According to the invention, this object is achieved in respect of the optical lens mentioned at the outset by virtue of the fact that the second lens element is configured as at least one lens segment that is only arranged in a margin region of the first lens element.

The optical lens according to the invention departs from the previously pursued concept of achieving an achromatic effect over the entire surface of the lens. Rather, the at least partial achromatic effect is restricted to the margin region of the lens in the case of the optical lens according to the invention, in other words, the optical lens according to the invention constitutes a partial achromat; i.e. if the optical lens is used as a spectacle lens, the spectacle lens is only achromatized in a margin region. The prior art has not considered that the transverse chromatic aberration in particular, which is expressed in the perception of coloured fringes, greatly increases from the centre of the spectacle lens, i.e. from its optical axis that corresponds to the direction of looking straight ahead, to the margin of the spectacle lens. Annoying coloured fringes are only noticed by the wearer of the spectacles when the viewing direction (visual angle) deviates strongly from the direction of looking straight ahead, i.e. if the wearer of the spectacles peers through the margin of the spectacle lens.

To this end, in the optical lens according to the invention, the second lens element is restricted to one or more lens segments that is/are only arranged in a margin region of the first lens element. By contrast, the second lens element is not present in the central region of the optical lens, which contains the optical axis, and so the lens can be constructed like in a conventional spectacle lens in this region.

The advantage of the optical lens according to the invention consists in the fact that the chromatic effect is controlled where it is strongest and noticeably perceived by the wearer of the spectacles, while the optical lens overall can substantially have the same thickness and the same weight as a spectacle lens without achromatization.

In a preferred embodiment, the at least one lens segment extends along the margin region of the first lens element over part of the circumference.

An advantage of this is that further weight can be saved by the at least one lens segment extending only over a partial region of the margin region of the first lens element, i.e. over part of the circumference. In this case, the at least one lens segment is to be provided at a site in the margin region of the first lens element at which achromatization of the lens is desired.

As an alternative to the embodiment mentioned above, the second lens element preferably has precisely one lens segment that extends along the margin region of the first lens element over the entire circumference.

An advantage of this is that the lens according to the invention is at least partly achromatized along the entire margin region.

In a further preferred embodiment, the second lens element is arranged on the rear side of the first lens element.

In this case, "rear side" designates the side of the lens facing the eye of the wearer.

Since optical lenses that are used as spectacle lenses usually have a concave curvature as seen from the eye of the wearer, this measure is advantageous in that the thickness of the optical lens is not excessively thick even in its margin region compared to conventional optical lenses, despite the presence of the second lens element in this margin region. An increase in the thickness is avoided in particular if the rear side of the first lens element is convex and the at least one lens segment of the second lens element is arranged in the vertex region of the rear side of the first lens element.

According to the invention, provision is also made for a method for producing an optical lens, in particular for use as a spectacle lens, comprising the steps of providing a first lens element blank and a second lens element blank, wherein the second lens element blank is manufactured from a material, the Abbe number and/or refractive index of which differs from the Abbe number and/or the refractive index of the material of the first lens element blank, removing material from the second lens element blank until a second lens element is created from the second lens element blank, which second lens element is configured as at least one lens segment.

Thus, the second lens element blank can for example be provided as a bi-concave negative lens, from which the central region inside the margin region of this lens element blank is completely removed.

The at least one lens segment created thus can either be subsequently applied to the first lens element blank and be connected to the latter e.g. by cementing or, as provided in a preferred embodiment, the first and the second lens element blank are interconnected, in particular cemented to one another, before material is removed from the second lens element blank.

Hence, as per this measure, a "basic achromat" is firstly produced from the two lens element blanks and the partial achromat according to the invention is subsequently produced from this basic achromat by removing material from the second lens element blank.

In the process, preference is furthermore given to the practice of, additionally, removing material from the first lens element blank in order to obtain a first lens element that has been processed in accordance with the prescription for correcting a defective eyesight.

In conjunction with the aforementioned measure, the material removal can be continued into the first lens element blank from the second lens element blank, wherein the processing of the first lens element blank serves as per the prescription for correcting a defective eyesight. In conjunction with this measure, the first lens element blank can be provided as an initially biconvex lens.

The method according to the invention for producing the optical lens according to the invention in the form of a partial achromat can be carried out in a particularly simple and cost-effective fashion using the aforementioned measures.

Further advantages and features emerge from the subsequent description and the attached drawing.

It is understood that the features that were mentioned above and that are yet to be explained below can be used not only in the respectively specified combination, but also in other combinations or on their own, without departing from the scope of the present invention.

BRIEF DESCRIPTION OF THE SEVERAL VIEWS OF THE DRAWINGS

The invention will now be described with reference to the drawings wherein.

DETAILED DESCRIPTION OF THE INVENTION

Figure 1:
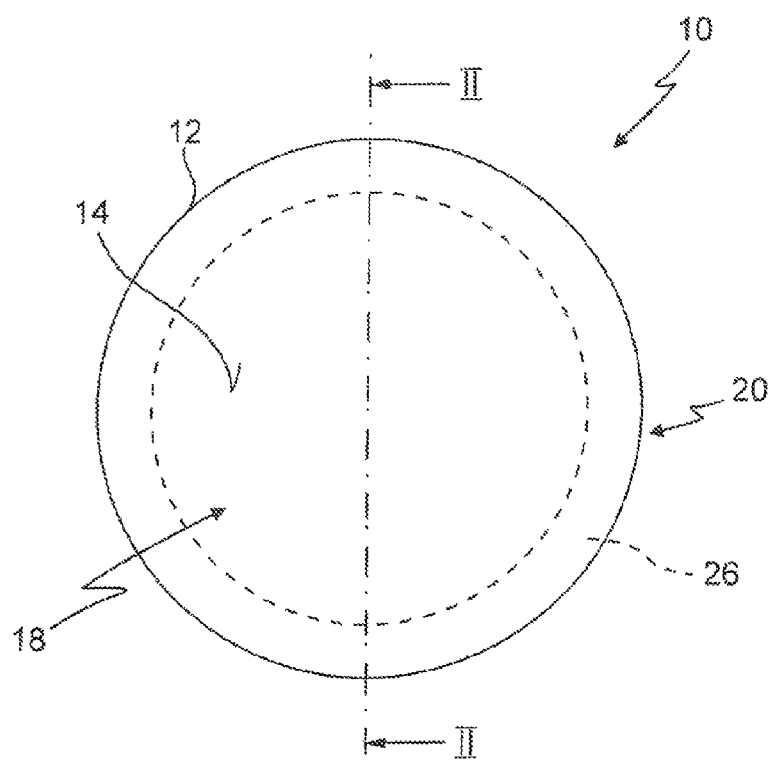
FIG. 1 shows a front view of a schematic illustration of an optical lens that is embodied as a partial achromat.
Figure 2:
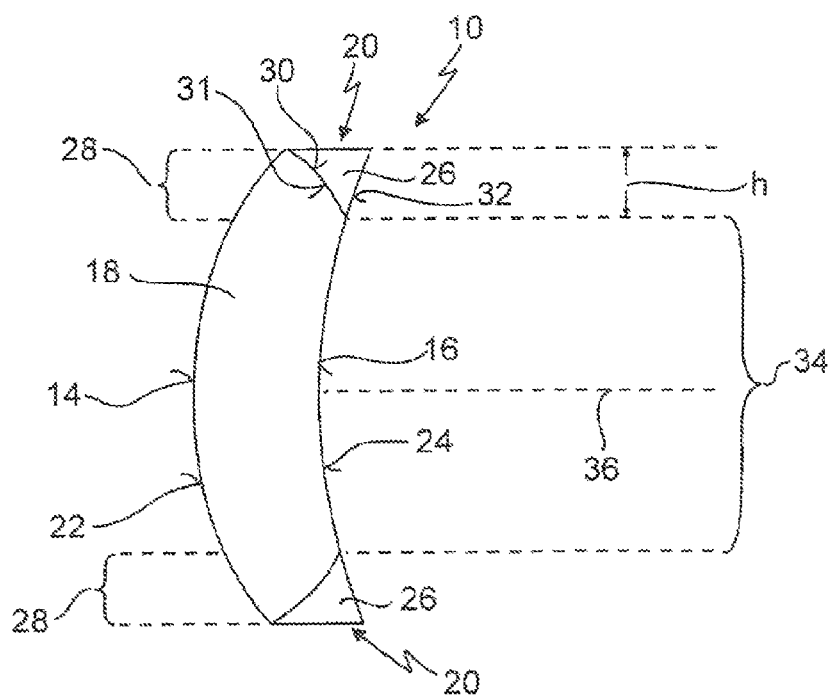
FIG. 2 shows the optical lens from FIG. 1 in a section along the line II-II in FIG. 1.

FIGS. 1 and 2 illustrate an optical lens, labelled with the general reference sign 10, which is destined for use as a spectacle lens.

As per FIG. 1, the lens 10 is illustrated as a lens with a circular margin 12. However, it is understood that the present invention is not restricted to circular optical lenses; rather, the lens 10 can have any other, for example polygonal, in particular rectangular, oval or other, basic shape.

The lens 10 has a front side 14 and a rear side 16. The rear side 16 is that side of the lens 10 that faces the eye of the wearer of the spectacles when the lens 10 is used as a spectacle lens. The curvatures of the front side 14 and rear side 16, and the (central) thickness of the lens 10, illustrated in FIG. 2, should be understood to be exemplary.

The lens 10 has a first lens element 18 and a second lens element 20.

In the shown exemplary embodiment, the first lens element 18 has a front surface 22 and a rear surface 24. In the shown exemplary embodiment, the front surface 22 is convex and the rear surface 24 is concave. However, the convex-concave embodiment of the first lens element 18 in this case should only be understood as being exemplary, and the invention is not restricted to this.

Nor is the first lens element 18 restricted as to whether it has a positive or negative power. Rather, the first lens element 18 is, in terms of shape, material, polish, etc., matched to the optical effect required for correcting a defective eyesight in accordance with a customer-specific prescription.

The second lens element 20 is embodied in the form of at least one, here precisely one lens segment 26, which is only arranged in a margin region 28 of the first lens element 18.

Here, the lens segment 26 extends along the margin region 28 of the first lens element 18 over the entire circumference.

The lens segment 26 is arranged on the rear side 16 of the first lens element 18.

The lens segment 26 is fixedly connected, e.g. by cementing, to the first lens element 18 along mutually complementary surfaces 30, 31 of the first lens element 18 and the lens segment 26. Since the surface 30 of the first lens element 18 is convex, the corresponding surface 31 of the lens segment 26 is concave. A rear side 32 of the lens segment 26 is likewise concave in this case, and so the lens segment 26 overall has a biconcave design. Hence the lens segment 26 has a negative optical power, while the first lens element 18 is positive at least in the margin region 28 thereof as a result of the biconvex design thereof at this location.

The second lens element 20 in the form of the lens segment 26 acts together at least partly achromatically with the first lens element 18. The material of the first lens element 18 and the material of the second lens element 20 are to this end selected accordingly in terms of their Abbe numbers and/or refractive indices. In respect of the dispersion behaviour thereof, the second lens element 20 and the first lens element 18 are matched to one another such that the desired achromatic effect of the lens 10 is achieved in the margin region thereof.

Since the second lens element 20 in the form of the lens segment 26 is only present in the margin region 28 of the first lens element 18, the rear side 16 of the lens 10 is substantially formed by the rear side of the first lens element 18, i.e. there only is the first lens element 18 in a central region 34.

The height h of the margin region 28, over which the second lens element 20 extends in respect of an optical axis 36, is dependent on the optical effect of the lens 10, the utilized material, in particular the Abbe number thereof, the design of the lens 10, i.e. whether the lens 10 is flat, curved, aspherical, etc., and the individual sensitivity of the wearer of the spectacles in which the lens 10 is utilized.

The aberrations important for spectacle lenses, such as spherical aberration, oblique astigmatism, etc., can be corrected, taking into account the material configuration of the lens 10, by appropriate processing of the rear side 16, for example by introducing an asphere, an atorus, a freeform etc.

Figure 3:
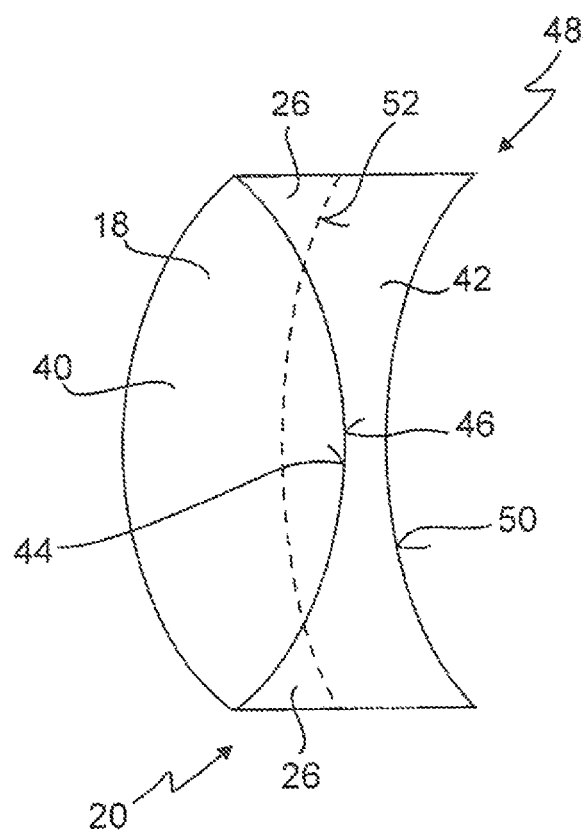
FIG. 3 shows a pre-form of the optical lens from FIG. 1 for explaining a method for producing the optical lens from FIG. 1.

With reference to FIG. 3, the following text describes how the optical lens 10 can be produced.

The production method for producing the optical lens 10 firstly consists in manufacturing a "basic achromat".

To this end, provision is made for a first lens element blank 40 and a second lens element blank 42. In the illustrated exemplary embodiment, the first lens element blank 40 has a biconvex design and the second lens element blank 42 has a biconcave design.

The first lens element blank 40 and the second lens element blank 42 are subsequently interconnected, for example cemented, along two mutually complementary surfaces 44 of the first lens element blank 40 and 46 of the second lens element blank 42.

The basic achromat 48 created thus is subsequently processed for producing the finished optical lens 10.

To this end, material from the second lens element blank 42 is removed from a rear side 50 of the second lens element blank 42, for example by means of usual material removal methods that are utilized in the production of spectacle lenses.

Here, the removal of material from the second lens element blank 42 does not finish at the surface 44 of the first lens element blank 40; rather, material is also removed from the first lens element blank 40 until a rear side 52 of the basic achromat 48 is created, which is illustrated in FIG. 3 by a dashed line and corresponds to the rear side 16 of the finished optical lens 10 as per FIG. 2. The rear side 52 is then finished, e.g. lapped and polished.

Thus, by removing material from the second lens element blank 42 and into the first lens element blank 40, the first lens element 18 and the second lens element 20 in the form of the lens segment 26 are created, which lens segment extends along the margin region 28 of the first lens element 18 over the entire circumference.

The invention claimed is:

1. A spectacle lens comprising a first lens element and a second lens element,
   wherein the first lens element and the second lens element achieve an achromatic effect in a margin region of the first lens element,
   wherein the second lens element is manufactured from a material, the Abbe number and/or refractive index of which differs from the Abbe number and/or the refractive index of the material of the first lens element,
   wherein the second lens element is configured as precisely one lens segment that is only arranged in the margin region of the first lens element,
   wherein there is only the first lens element in a central region,
   wherein the precisely one lens segment extends along the margin region of the first lens element over the entire circumference,
   wherein a rear side of the spectacle lens is formed by a rear side of the first lens element and a rear side of the lens segment, and wherein the spectacle lens is only achromatized in the margin region.

2. A method for producing a spectacle lens,
wherein the spectacle lens comprises a first lens element and precisely one lens segment that is only arranged in a margin region of the first lens element,
wherein there is only the first lens element in a central region,
wherein the precisely one lens segment extends along the margin region of the first lens element over the entire circumference, and
wherein a rear side of the spectacle lens is formed by a rear side of the first lens element and a rear side of the lens segment, the method comprising the steps of:
providing a first lens element blank and a second lens element blank, wherein the second lens element blank is manufactured from a material, the Abbe number and/or refractive index of which differs from the Abbe number and/or the refractive index of the material of the first lens element blank to achieve an achromatic effect in the margin region of the first lens element,
removing material from the second lens element blank until a second lens element is created from the second lens element blank, which second lens element is configured as the precisely one lens segment, and
achromatizing the spectacle lens only in the margin region of the first lens element.

3. The method of claim 2, wherein the first and the second lens element blank are interconnected before material is removed from the second lens element blank.

4. The method of claim 2, wherein, additionally, material is removed from the first lens element blank in order to obtain a first lens element that has been processed in accordance with the prescription for correcting a defective eyesight.

\* \* \* \* \*